United States Patent [19]

Mehring et al.

[11]  4,298,624

[45]  Nov. 3, 1981

[54] PROTECTION AGAINST MITE CONTAMINATION

[75] Inventors: Jeffrey S. Mehring, Battle Creek; Ronald J. Sayen, Portage; Robert E. Schara, Battle Creek; Charles T. Stocker, Augusta, all of Mich.; Juan G. Rodriguez, Lexington, Ky.

[73] Assignee: General Foods Corp., White Plains, N.Y.

[21] Appl. No.: 817,382

[22] Filed: Jul. 20, 1977

Related U.S. Application Data

[63] Continuation of Ser. No. 680,305, Apr. 26, 1976, abandoned, which is a continuation of Ser. No. 338,020, Mar. 5, 1973, abandoned, which is a continuation of Ser. No. 81,617, Oct. 16, 1970, abandoned.

[51] Int. Cl.$^3$ ............................ A23K 3/00; A23L 3/34
[52] U.S. Cl. ..................................... 426/532; 426/805
[58] Field of Search ................ 424/317; 426/335, 321, 426/532, 654, 805

[56]  References Cited

U.S. PATENT DOCUMENTS

| | | | |
|---|---|---|---|
| 1,589,866 | 6/1926 | Siegler | 424/318 |
| 3,276,881 | 10/1966 | Troller | 426/532 |
| 3,279,983 | 10/1966 | Baker | 424/219 |
| 3,408,200 | 10/1968 | Teichman | 424/319 |
| 3,510,317 | 5/1970 | Fernholz | 426/9 |
| 3,658,548 | 4/1972 | Haas | 426/72 |
| 3,667,970 | 6/1972 | Scheide | 426/92 |
| 3,679,429 | 7/1972 | Mohrman | 426/93 |

*Primary Examiner*—Hiram Bernstein
*Attorney, Agent, or Firm*—Mitchell E. Alter; Daniel J. Donovan; Bruno B. Struzzi

[57]  ABSTRACT

A shelf-stable intermediate moisture food with a water content of about 15 to 50% and with water soluble solutes in an amount to provide bacteriostasis is protected against the infestation and reproduction of mites by incorporation of a material selected from the group consisting of fatty acids containing carbon atoms from $C_4$ to $C_{10}$, fatty acid amides containing carbon atoms from $C_3$ to $C_{10}$, fatty acid esters containing carbon atoms from $C_3$ to $C_{10}$, fatty acid salts containing carbon atoms from $C_3$ to $C_{10}$, propionic acid and mixtures thereof with the propionic acid being employed only in conjunction with the fatty acid, amide, ester or salt.

8 Claims, No Drawings

PROTECTION AGAINST MITE CONTAMINATION

This is a Continuation of Application Ser. No. 680,305, filed Apr. 26, 1976, which is now abandoned, which is a continuation Application Ser. No. 338,020, filed Mar. 5, 1973, which is now abandoned, which is a continuation of Application Ser. No. 81,617, filed Oct. 16, 1970, which is now abandoned.

BACKGROUND OF THE INVENTION

The present invention is directed to so-called intermediate moisture foods which class of foods have long shelf life when stored under non-refrigerated conditions in any moisture impermeable container such as a cellophane wrapper. These foods contain a substantial moisture content yet possess the property of resistance of bacterial decomposition.

Prior art workers, as for example, Burgess, et al. in U.S. Pat. Nos. 3,202,514 and 3,482,985, have provided the concept of packaging nutritionally balanced animal foods with extended shelf life when packaged in any moisture impermeable container, eliminating the need for expensive canning operations. These intermediate moisture foods contain a preservation system which eliminates the need for special techniques such as commercial sterilization incident to the packaging procedure. In intermediate moisture foods, the composition is formulated to preserve against bacteria and fungal growth by employing a combination of water soluble ingredients, such as sugars, salts, sorbitol, propylene glycol, glycerine and other low molecular weight substances in combination with an antimycotic such as sorbic acid and its salts.

The intermediate moisture food components are known to prevent both bacteria and mold growth when the moist food has been stored in any moisture impermeable container. However, due to extended periods of time that the intermediate moisture food may be stored in a container or wrapping such as cellophane, infestation by minute arachnids or mites may take place. Mites thrive on a soft-moist food especially when it is nutritionally balanced and extensive storage times permit undesirable reproduction and growth. The problem of mite control did not occur before the existence of soft-moist intermediate moisture foods which have an ideal moisture content for mites. Storage for long time periods at room temperature rather than in a cooler or freezer and in any moisture impermeable wrapping material has prompted a need for controlling mites without resorting to chemical insecticides which are not compatible for food utility.

SUMMARY OF THE INVENTION

The purpose of this invention is directed to the prevention of growth and reproduction of mites in intermediate moisture foods containing a water content by weight of between 15 to 50%. It has been discovered that inclusion of specific fatty acids and derivatives thereof is effective in limiting the survival of mites in an intermediate moisture that is shelf stable due to the preservation system. Additionally, if mites should invade the food environment, the use of fatty acids in given concentrations prohibits their tendency to reproduce as well as to survive in the intermediate moisture food environment.

The sources of fatty acids providing protection against mites contain carbon atoms from $C_4$ to $C_{10}$. Additionally, fatty acid derivatives chosen from amides, esters and salts are desirable when the chain length is from $C_3$ to $C_{10}$. Some fatty acid salts may contain sodium. Small concentrations of these fatty acid, fatty acid derivatives and combinations have been found effective in providing the requisite protection.

The percentage of these materials is variable and ordinarily ranges from 0.5% to 3.0% of the comestible weight. However, it is possible to minimize the use of the fatty acid and/or fatty acid derivatives by the addition of propionic acid. In such latter case the total content of propionic acid with the named fatty acid and/or derivatives ordinarily ranges from about 0.5% to about 3.0%.

It is an object of the present invention to provide a soft, moist food containing a moisture content of between 15 to 50% with shelf stability due to a preservation system and which has substantially complete resistance of the infestation of mites.

DETAILED DESCRIPTION OF THE INVENTION

A general class of foods in which protection against mites is provided is animal foods. However, the concept of prevention of mite infestation is of broad scope since it is applicable to any so-called intermediate moisture food that is a food having shelf-stability in any moisture impermeable container without a need for refrigeration. The sole requirement is the food contain a preservation system. Thus, the concept of providing the shelf-stability may be utilized in a wide variety of shelf stable products including meats, french toast, pancakes, waffles, soups, etc., that would be packaged with substantial moistness due to the water content.

The intermediate moisture food employs the concept of limiting the amount of unbound water capable of supporting microbiological spoilage. The food contains a sufficient amount of soluble solids which limits the amount of "free" water available for bacterial growth under ambient conditions. In addition to the soluble solids, the food preferably contains an antimycotic agent, since because of the high nutritional content, the food may be susceptible as a host for fungi, yeast or mold.

The types of soluble solids that give satisfactory results are varied and ordinarily of low molecular weight. Preferably, these solutes include any of common sugars which are soluble in water in an amount sufficient to give a bacteriostatic effect. The total weight of the water soluble solids is generally at least equal to the total water in the food product. However, successful results have been realized when the total weight of water soluble materials is less than the weight of water in the composition. The criteria between the weight of water to weight of water soluble solids is that a required osmotic pressure is obtained which in turn provides the required bacteriostatic effect. Additional examples that are water soluble other than sugar include low molecular compounds such as sorbitol, propylene glycol and sodium chloride.

To prevent mold growth an antimycotic agent is preferably employed at a level sufficient to prevent the growth of such organisms. Illustrative of suitable antimycotic agents are sorbic acid as well as sorbate salts such as potassium sorbate and calcium sorbate.

The sources of food in which the intermediate moisture concept is provided is varied. Hence, the makeup of the food composition may vary quite extensively. For example, Burgess U.S. Pat. Nos. 3,202,514 and 3,482,985 which employ a compatible system to the present disclosure refer to many nutritional components such as meat and meat by-products, poultry, fish, vegetable proteinaceous as oil seeds and legumes, skim milk solids, etc. The exact manner and exact sources of the food materials is determined in part by the type of food that is being produced. For example, a food high in protein may be formulated in contrast to a starchy product. Also for example, foods rich in proteinaceous meat materials may be made or foods without meat, but rich in vegetable protein. Therefore, the specific source ingredients of the food aside from the materials that yield protection against mites is not a part of the inventive aspect of the present invention. The sole criteria is the fact that the food possesses intermediate moisture characteristics between 15 to 50% by weight water and is shelf stable for extended time periods when wrapped in any moisture impermeable container. The food will contain a preservation system which employs the concept of raising the osmotic pressure to a level to give a sufficient bacteriostatic effect.

The soft, moist intermediate moisture food is imparted with mite protection by incorporation of fatty acids of chain length from $C_4$ to $C_{10}$. Additionally, fatty acid derivatives of $C_4$ to $C_{10}$ chain length, as well as $C_3$ fatty acid derivatives provide mite protection. These derivatives include amides, esters and salts. These fatty acids and derivatives alone or in combination with one another will be incorporated into the food matrix. The addition may be by any of several conventional techniques, such as introducing the fatty acid component into the liquid portion of the food which thereafter is mixed with the solid ingredients. An alternative technique is direct mixing of all components substantially simultaneously. Any technique of mixing is possible so long as the fatty acid material is present throughout the basic food.

The concentration of the additive fatty acid ester, fatty acid salt or combinations thereof is present in an effective amount to obtain the desired degree of mite protection. This effective amount at a minimum content of additive will ordinarily be about 0.5% by weight. Maximum additive content is a question of choice but as a practical matter adding a significant excess of the fatty acid component is unnecessary. A desirable range of fatty acid or fatty acid derivative is about 0.5 to 3.0% by weight. The exact minimum percentage that will obtain optimum results against mites is dependent upon the numerous variables including the specific fatty acid, derivative or mixture, the type of food and its ingredients, the total moisture content, and the type of source materials incorporated into the food for their preservation against bacteria as well as yeast and mold. Further considerations determining the exact concentration and choice of the fatty acid is the overall flavor impact of these additives which will differ with the comestible substrate.

Additionally, it has been found that another fatty acid may act as an extender in conjunction with the named fatty acids and derivatives so that these primary materials affording mite protection may be reduced in their content and concentration. This fatty acid, propionic acid in conjunction with the primary mite inhibitor, permits the total weight concentration of these materials in conjunction with one another to be within the same range as though the primary fatty acid component were employed alone. For example with the desirable range of primary fatty acid and/or fatty acid derivative between 0.5 to 3.0% by weight, the total weight of the fatty acid and/or fatty acid derivative with the added weight of propionic acid will be within the same weight range of 0.5 to 3.0%. Thus, it is considered that the use of propionic acid may directly substitute on a weight basis for the primary fatty acid so long as the propionic acid is used as a supplemental or additive component to the class of fatty acids and derivatives disclosed. While propionic acid per se affords some protection against mites, it is the purpose of using propionic acid in the present disclosure that it only serves as an extender. In other words, if this fatty acid is employed it is used in conjunction with at least one of the additionally named fatty acids and fatty acid derivatives.

As mentioned previously, required intermediate moisture characteristics are known in the prior art and employ the principle of employing soluble solids or liquids that can be any edible material capable of increasing the water osmotic pressure in which they are dissolved, giving rise to the needed bacteriostatic effect. Additionally, it has been found that an antimycotic is preferably employed in combination with the other materials to prevent mold growth. In place of employing an antimycotic, other techniques are possible such as use of gamma and/or beta radiation.

To further illustrate the novel aspects of this invention, the following examples are provided:

EXAMPLE I

In all of the examples, the procedure is identical to determine the resistance of the intermediate food to mite infestation. The base food, whether it be a control or a product within the scope of this invention, is initially wrapped in a container such as cellophane which provides protection against ambient conditions and at the same time seals the food. Each sample that is listed is in reality 10 reproductions of the same test with the overall results of mite infestation added due to difficulty in giving absolute answers in counting the mites and to reduce random error.

Into each cellophane container which contains the food, 10 female mites (*Tyrophogus Putrescentiae*) are introduced and the cellophane resealed against the atmosphere. These samples are stored at about 70° F. and 50% relative humidity for a six-week period of time.

The following composition dog food was employed neglecting the added water content and fatty acid since these materials are the variables:

|  | % |  | % |
| --- | --- | --- | --- |
| Soy Grits | 31.8 | Tripe | 24.5 |
| Sugar | 19.3 | Beef Trimmings | 10.7 |
| Soy Hulls | 2.1 | Propylene Glycol | 2.0 |
| Calcium Phosphate | 2.2 | Emulsifier | 1.0 |
| Whey | 1.5 | Tallow | 2.1 |
| Salt | 1.2 |  |  |
| Calcium Carbonate | 0.9 |  |  |
| Potassium Sorbate | 0.2 |  |  |
| Garlic | .2 |  |  |
| Vitamins | .2 |  |  |
| Dye | trace |  |  |

The food is prepared by chopping and grinding the tripe and beef trimmings into small pieces. The ground meat, along with propylene glycol, emulsifier, tallow and the variables of water and fatty acid are formed into a slurry in a jacketed agitated cooker. The ingredients are brought to a boil. The remaining ingredients, which are dry, are mixed and added to the slurry in the cooker and the total mixture heated to above 180° F. with a heating time of 15-20 minutes. The mix is discharged from the cooker and cooled to room temperature by passing through a refrigerated Holoflite cooler. The cooled product is formed into short strands of about 1-3" in length and 5/32" in diameter by passing through an extruder. The extruder product is formed into patties and packaged in a cellophane wrap.

The following table summarizes the results obtained at two different moisture concentrations (22.5% and 27.5%) at different concentrations of caproic, and capric, and combinations thereof as well as employing propionic acid as an extender. The control sample which did not contain the fatty acid showed mold growth which interfered with the tests. The use of the fatty acid in the table below exhibits antimycotic properties, at least to some degree as evidenced by lack of mold growth, and aid in providing additional protection to the preservation system. Since mold growth apparently competes with mites, 0.3% of potassium sorbate, an antimycotic, was added to control samples to present a true picture of the ability of mites to survive and reproduce in the control without competing mold growth.

| Moisture (%) | Potassium Sorbate, % | % Individual Acids Added | | | Mites |
|---|---|---|---|---|---|
| | | Capric | Caproic | Propionic | |
| 22.5 | 0 | 0.5 | 0.5 | 0 | 13 |
| 22.5 | 0 | 0.5 | 0 | 0.5 | 15 |
| 22.5 | 0 | 0 | 0.5 | 0.5 | 17 |
| 22.5 | 0 | 0.5 | 0.25 | 0.25 | 16 |
| 22.5 | 0 | 1.0 | 1.0 | 0 | 0 |
| 22.5 | 0 | 1.0 | 0 | 1.0 | 0 |
| 22.5 | 0 | 0 | 1.0 | 1.0 | 0 |
| 22.5 | 0 | 1.0 | 0.5 | 0.5 | 1 |
| 27.5 | 0 | 1.0 | 1.0 | 0 | 3 |
| 27.5 | 0 | 1.0 | 0 | 1.0 | 36 |
| 27.5 | 0 | 0 | 1.0 | 1.0 | 1 |
| 27.5 | 0 | 1.0 | 0.5 | 0.5 | 5 |
| 22.5 | 0 | 0 | 0 | 0 | 111* |
| 22.5 | 0.3 | 0 | 0 | 0 | 131 |
| 27.5 | 0.3 | 0 | 0 | 0 | 470 |

*Mold growth.

EXAMPLE 2

The procedure of Example I was followed concerning the incorporation of the mites in the food sample. However, the formulation of the food is primarily as a cat food and comprised the following ingredients to give a 45% moisture and a 1% total fatty acid content:

| Slurry | (%) | Dry | (%) |
|---|---|---|---|
| Whole ground chicken | 24.0 | Dextrose | 15.1 |
| Liver | 9.0 | Corn flour | 6.2 |
| Fish Meal | 5.0 | Oat flour | 6.2 |
| Animal Fat | 7.5 | sodium Caseinate | 6.2 |
| H3PO4 | 1.5 | CMC | 1.6 |
| Potassium sorbate | 0.2 | Solka-floc | 1.45 |
| Emulsifier | 0.32 | Salt | 1.5 |
| Water | 11.83 | Vitamins | 0.073 |
| Fatty Acid | 1.0 | Dye | 0.01 |

The cat food was prepared by chopping and grinding the meats into small pieces which are then added to a jacketed cooker along with the emulsifiers, animal fat, and fish meal. These ingredients are brought to a boil and then the remaining slurry ingredients are added and the total slurry was cooked about one hour, thereby effecting pasteurization and producing a liquefied slurry composition. The slurry was then finely ground through an emulsifier into a more or less pulpy, pumpable, flowable puree consistency.

The dry ingredients were mixed together and added to the hot slurry in a jacketed double sigma-bladed mixer. The total mix was heated for 15 minutes until it reached 190° F.

The cooked dough was extruded hot into one quarter inch pellets which were immediately cooled by passing them over a cooling screen, transmitting dry cool air, to an ambient temperature of 80° F. The cooled pellets were then packaged in cellophane.

The following Table summarizes the results obtained:

| Capric (%) | Caproic (%) | Propionic (%) | Mites |
|---|---|---|---|
| 0.5 | 0.5 | 0 | 0 |
| 0.5 | 0 | 0.5 | 0 |
| 0 | 0.5 | 0.5 | 0 |
| 0.5 | 0.25 | 0.25 | 0 |
| *0 | 0 | 0 | 22 |

*Control without fatty acid.

EXAMPLE 3

Several illustrative esters and salts are given. The esters employed are the methyl esters derived from propionic, caproic, caprylic and capric acids. The salts are the copper salts of capric, caprylic and caproic acids. Since the effectiveness of capric, caprylic and caproic acids is demonstrated (as illustrated by Example 1 and 2), these acids were also utilized to show their effectiveness in comparison with the esters and salts.

The following base food composition (neglecting the fatty acid component) was employed as the comestible with the incorporation of the mites in similar fashion as Example I:

| | (%) | | (%) |
|---|---|---|---|
| Soy Grits | 31.8 | Tripe | 25.5 |
| Sugar | 19.3 | Beef Trimmings | 11.7 |
| Soy Hulls | 2.1 | Emulsifier | 1.0 |
| Calcium Phosphate | 2.2 | Tallow | 2.1 |
| Whey | 1.5 | | |
| Salt | 1.2 | | |
| Calcium Carbonate | 0.9 | | |
| Potassium Sorbate | .2 | | |
| Garlic | .2 | | |
| Vitamins | .2 | | |
| Dye | trace | | |

The results are listed below and include the total mite count for ten samples at the end of 3 weeks as well as 6 weeks:

| Sample No. | Form | % Propionic | % Capric | % Caprylic | % Caproic | Count at 3 Weeks | Count at 6 Weeks |
|---|---|---|---|---|---|---|---|
| 2 | Basic | 0 | 1.5 | 0 | 0 | 223 | 167 |
| 3 | Basic | 0 | 0 | 1.5 | 0 | 27 | 8 |
| 4 | Basic | 0 | 0 | 0 | 1.5 | 0 | 0 |
| 16 | Control | 0 | 0 | 0 | 0 | 643 | 6400 |
| 18 | Meth* | 0 | 1.5 | 0 | 0 | 0 | 0 |

-continued

| Sample No. | Form | % Propionic | % Capric | % Caprylic | % Caproic | Count at 3 Weeks | Count at 6 Weeks |
|---|---|---|---|---|---|---|---|
| 19 | Meth | 0 | 0 | 1.5 | 0 | 1 | 1 |
| 20 | Meth | 0 | 0 | 0 | 1.5 | 0 | 0 |
| 21 | CS** | 1.5 | 0 | 0 | 0 | 21 | 1 |
| 22 | CS | 0 | 1.5 | 0 | 0 | 93 | 58 |
| 23 | CS | 0 | 0 | 1.5 | 0 | 13 | 1 |
| 24 | CS | 0 | 0 | 0 | 1.5 | 1 | 0 |

*Methylester of fatty acid.
**Copper salt of fatty acid.

The above examples are representative and not for limiting the scope of the invention which is set forth in the claims. It will become readily apparent that various fatty acids and amides, esters and salts other than those specifically named in the examples may be employed. The necessary criteria is the additive fatty acid component fall within the named class of acids, amides, esters and salts. Illustratively through only a single example other fatty acid salts may be employed than those named such as a calcium containing salt. Another single example of fatty acid salts that may be employed is a sodium containing salt. Hence those skilled in the art will understand that variations may be made without departing from the spirit of the invention and the scope of the appended claims.

What is claimed is:

1. A food composition having a moisture content of about 15 to 50% by weight comprised of a comestible material normally capable of supporting bacteriological growth, water soluble solutes in an amount to provide bacteriostasis to said food composition, and a material affording protection against the infestation and reproduction of mites of an effective amount of from 1.0 to 3.0% by weight fatty acid component selected from the group consisting of straight chain fatty acids containing carbon atoms from $C_4$ to $C_{10}$, fatty acid amides derived from fatty acids containing carbon atoms from $C_3$ to $C_{10}$, fatty acid salts derived from fatty acids containing carbon atoms from $C_3$ to $C_{10}$, propionic acid and mixtures thereof, said propionic acid being employed only in conjunction with said fatty acid, amide, ester or salt.

2. The method of claim 1 wherein said fatty acid is capric.

3. The method of claim 1 wherein said fatty acid is caproic.

4. The method of claim 1 wherein said fatty acid is caprylic.

5. The method of claim 1 wherein said fatty acid ester is methyl ester.

6. The method of claim 1 wherein said fatty acid salt contains copper.

7. The method of claim 1 wherein said fatty acid salt contains sodium.

8. The method of claim 1 wherein said fatty acid salt contains calcium.

* * * * *